United States Patent [19]

Schlapp et al.

[11] 4,417,763
[45] Nov. 29, 1983

[54] SLIDING-TILTING-ROOF FOR MOTOR VEHICLES

[75] Inventors: Albert Schlapp, Dreieich; Rudolf Roos, Maintal, both of Fed. Rep. of Germany

[73] Assignee: Rockwell International Corporation, Pittsburgh, Pa.

[21] Appl. No.: 268,033

[22] Filed: May 28, 1981

[30] Foreign Application Priority Data

May 30, 1980 [DE] Fed. Rep. of Germany ....... 3020675

[51] Int. Cl.³ ............................................. B60J 7/04
[52] U.S. Cl. ..................................... 296/216; 296/221
[58] Field of Search ................ 296/216, 221, 222, 223

[56] References Cited

U.S. PATENT DOCUMENTS 4,272,122  6/1981  Schätzler ............................. 296/221
4,342,482  8/1982  Koral ................................... 296/221

FOREIGN PATENT DOCUMENTS

2245084  3/1974  Fed. Rep. of Germany ...... 296/221
1920481  3/1978  Fed. Rep. of Germany ...... 296/221
2648664  5/1978  Fed. Rep. of Germany ...... 296/221
2839786  3/1980  Fed. Rep. of Germany ...... 296/221

*Primary Examiner*—Bruce H. Stoner, Jr.
*Assistant Examiner*—John A. Carroll

[57] ABSTRACT

A sliding-rising roof for motor vehicles having a rigid cover plate which, in its closed position, closes a roof cut-out while forming an encircling marginal gap. The cover plate has front and rear slide blocks by which it is laterally guided on guide rails in the roof cut-out and is driven by pressure-resistantly and displaceably guided cables which engage the rear slide blocks. The roof can be either raised in the manner of front hinged ventilator flaps, by having its rear edge raised or, once its rear edge has been lowered, moved under the rear rigid roof cover.

19 Claims, 19 Drawing Figures

SLIDING-TILTING-ROOF FOR MOTOR VEHICLES

FIELD OF THE INVENTION

The invention relates to a sliding-rising roof for motor vehicles and having a rigid cover plate which, in its closed position, closes a roof cut-out while forming an encircling marginal gap, the said cover plate having front and rear slide blocks by which it is laterally guided on guide rails in the roof cut-out and being driven by pressure-resistantly and displaceably guided cables which engage the rear slide blocks and being capable of being as desired either raised in the manner of front hinged ventilator flaps, by having its rear edge raised or, once it rear edge has been lowered, moved under the rear rigid roof cover.

BACKGROUND OF THE INVENTION

In the case of known sliding-rising roofs (e.g. DAS No. 16 05 960), the sealing of the encircling annular gap against the penetration of water when the roof is in the closed position presents considerable difficulties, in particular between the rear edge of the cover plate and the adjacent edge of the roof cut-out. The reason for this is the absence of the trough-shaped profile which is usually found on sliding-only roofs and which is fixed to the sliding cover plate and engages below the rear marginal gap thereof (German Pat. No. 15 55 555). In the case of sliding-rising roofs, such a profile would prevent the rising function, i.e. the pivoting of the cover plate out of and above the fixded roof area. The sealing profile usually provided in the marginal gap and consisting of an elastomeric material cannot prevent the penetration of water with the necessary degree of reliability, particularly since the most accurate possible parallelism between the rear edge of the cover plate and the adjacent edge of the roof cut-out and a specific gap width are required for this to be assured. Furthermore, symptoms of wear and tear and ageing are to be found in the marginal gap seals which adversely affect the sealing-tightness of the marginal gap.

A further disadvantage of all the known sliding-roof constructions resides in the fact that in the position of closure, the cover plate is not sufficiently secure against its rear edge lifting. Therefore, when forced or even during movement of the motor vehicle and as the result of a difference in pressure between the interior of the vehicle and the flow of air over the vehicle roof, the pressure inside the vehicle being greater, it is possible for the rear edge of the cover plate to lift outwardly.

Finally, in the case of the known sliding-rising roofs, the front pivot axis or hinge arrangement is so constructed that when the cover plate is raised, there is a broad gap between the front edge of the cover plate which dips relatively far down into the roof cut-out and the adjacent edge of the roof cut-out and this can lead to undesirable noise while the vehicle is in motion.

SUMMARY OF THE INVENTION

The present invention is based on the problem of providing a sliding-rising roof which, in the position of closure, permits of a reliable seal of the marginal gap even with considerable gap measurement tolerances, to prevent undesirable lifting of its rear edge and, with the cover plate lifted, only a negligible gap at the front edge of the cover plate and thus only a negligible amount of noise.

On a basis of the construction indicated at the outset, the problem posed is resolved in that, in the vicinity of its front edge, the cover plate is pivotally mounted on an intermediate frame which is in turn pivotally mounted on the front slide blocks, at least its rear frame part engaging beneath the marginal gap with interposition of sealing elements which in the closed position bear on the underside of the cover plate on the one hand and on the underside of the roof area on the other, and in that the rear slide blocks are in driving connection with the intermediate frame and the cover plate, the intermediate frame being fixed in the closed position during pivoting movements of the cover plate and, starting from the closed position, being interlocked with the cover plate upon lowering of the rear edge of the cover plate and being displaceable together therewith.

The basic idea underlying the present invention resides in the fact of disposing between the rigid cover plate and the usual sliding roof frame fixed in the roof cut-out an intermediate frame which, by virtue of being disposed and constructed according to the invention, is suitable for overcoming the drawbacks inherent in all previous sliding-rising roof constructions. This intermediate frame has at least its rear frame part engaging below the marginal gap so that at this particularly critical area penetrating water can, without entering the interior of the vehicle, be dispsersed into the roof frame and cannot first pass through the marginal gap. Thus, the ingress of water into the interior of the vehicle is reliably prevented, in other words a reliable seal is achieved in respect of water penetrating the marginal gap, even quite substantial tolerances in gap dimensions failing adversely to affect this seal. The provision of the intermediate frame also provides the essential conditions whereby, when it is in its closed condition, the cover plate is secured against undesirable lifting of its rear edge, because the cover plate is interlocked with the intermediate frame. By reason of the fact that, in order to permit of its pivoting-out or lifting movement, the cover plate is no longer pivotally mounted at the front side blocks but on the intermediate frame, the pivot bearings can be disposed virtually in the immediate vicinity of the front edge of the cover plate, so that during the pivoting-out movement, the cover plate neither dips markedly into the roof cut-out nor admits of a relatively large gap between the front edge of the cover plate and the adjacent edge of the roof cut-out.

If the sliding-rising roof according to the invention is used in conjuction with a so-called weld-in roof frame, rectangular angled-over edges directed into the interior of the vehicle being provided to point downwardly along the front and lateral edges of the roof cut-out, corresponding upwardly angled edges of the roof frame being provided adjacent thereto, a flanged-over rim being provided at the rear edge of the roof cut-out, the disposition pursuant to the idea underlying the invention is such that at its front and along its lateral edges the intermediate frame is substantially flush with the corresponding edges of the cover plate, the lateral edges of the intermediate frame bearing in per se known manner on the encircling marginal gap seal fitted onto the encircling downwardly angled edge, the intermediate frame being displaceable in the direction in which the cover plate is raised, and in that its rear frame part has substantially the form of an open topped U-shaped profile onto the arms of which the strip-like sealing elements are fitted.

In the case of this first embodiment of the invention, care is taken to ensure that the rear marginal gap which is particularly susceptible to water penetration is reliably secured by the rear profiled part of the intermediate frame to prevent water penetrating the interior of the vehicle. Water which passes through the marginal gap is diverted to either side by the U-shaped profile of the rear frame part and is carried away by water gutters provided in the roof frame.

If the sliding-rising roof is used in conjunction with a so-called screw-in roof frame, in which case 180° flanged-over edges are provided on all the edges of the roof cut-out, adjacent to which there is at the front and sides an upper roof frame part which extends beneath the fixed roof area and which is separably connected to a lower roof frame part, forming a space which is open towards the roof cut-out. the disposition in a second embodiment of the invention is such that the intermediate frame projects beyond all the outer edges of the cover plate and, in the closed position, extends at the front and sides into the space which is open towards the roof cut-out and in that there is fixed on the outer rim of the intermediate frame an encircling profiled seal having a rib which extends into the marginal gap and on which sealing elements are mounted on both sides of the rib.

With this embodiment of sliding-rising roof according to the invention, the marginal gap has the encircling intermediate frame engaging beneath it, the one-piece encircling profiled seal, in the closed position, being tightly clamped between the intermediate frame on the one hand and the fixed roof area and rigid cover plate on the other. Therefore, the marginal gap is hermetically sealed on all sides of the cover plate, by reason of which outstanding noise damping is achieved when the cover plate is closed.

In this respect, it is advantageous if the per se known encircling downwardly angled edge of the cover plate, in the closed position and any position of displacement, engages a corresponding encircling depression in the profiled seal.

Common to both embodiments of the present invention are a number of features which will be explained hereinafter.

For pivotable connection of the cover plate to the intermediate frame, two mutually spaced-apart hinges are expediently provided, the hinge lug of which is towards the front edge of the cover plate and the hinge parts of which are fixed on the one hand on the cover plate and on the other on the intermediate frame. As a result, a very flat mounting is achieved which can be fitted in the vicinity of the front edge of the cover plate so that when the cover plate is raised, the leading edge thereof does not dip substantially below the fixed roof area. Furthermore, when the cover plate is raised, no considerable or noise generating gap space is created between the leading edge of the cover plate and the adjacent edge of the roof cut-out.

The driving connection of the rear slide blocks with the intermediate frame and the cover plate is advantageously so constructed that fixed on each of the two rear slide blocks there is a guide pin directed substantially horizontally and transversely of the direction of cover plate displacement, the guide pin engaging a first guide link mounted laterally on the intermediate frame and having pivotally mounted on its free end a raising lever which has two spaced-apart slide pins mounted on it which engage into a second guide link mounted laterally on the cover plate. The two guide links in conjunction with the raising lever and the guide pin control all movements of the cover plate and at the same time make it possible to secure the rear edge of the cover plate against undesired lifting when the cover plate is in its closed position.

Pursuant to the idea underlying the invention, it is envisaged that the first guide link comprises, elongated in the position of closure and in any raised position disposed parallel with the adjacent guide rail, a guide slot for the guide pin and, following on from the elongated guide slot, a shorter upwardly and rearwardly rising guide slot and in that the second guide link has a guide slot which is of approximately horizontal flat S-shape, and in that the raising lever is angled downwardly at an obtuse angle forming a shorter and a longer arm, a slide pin being fitted in each case at the apex of the angle and at the end of the shorter arm, while the longer arm has its end pivotally mounted on the guide pin.

For interlocking of the intermediate frame with the cover plate in the closed position and in any position of displacement, the arrangement is hereby advantageously such that the guide slot of the second guide link has in its rear zone and disposed opposite each other, parallel with each other and in the closed position likewise parallel with the adjacent guide rail, two portions on which, in the closed position, rest respective slide pins while the guide pin is located at the transition between the elongated and the shorter guide slot of the first guide link and in that the raising lever, in the closed position and any position of displacement, bears on the underside of an interlocking rib provided on the first guide link whereby, in any position of displacement, the slide pin mounted substantially at the apex of the angle of the raising lever is disposed at the rear end of the guide slot of the second guide link while the guide pin is located at the end of the shorter guide slot in the first guide link.

It is expedient for the raising lever to be composed of two identical parts connected to each other by the slide pins and between which there is disposed the second guide link and in which the guide pin is pivotally mounted.

BRIEF DESCRIPTION OF THE DRAWINGS

Further details of the invention will be explained in greater detail hereinafter with reference to examples of embodiment shown in the accompanying drawings, in which.

DETAILED DESCRIPTION OF THE INVENTION

Figure 1:
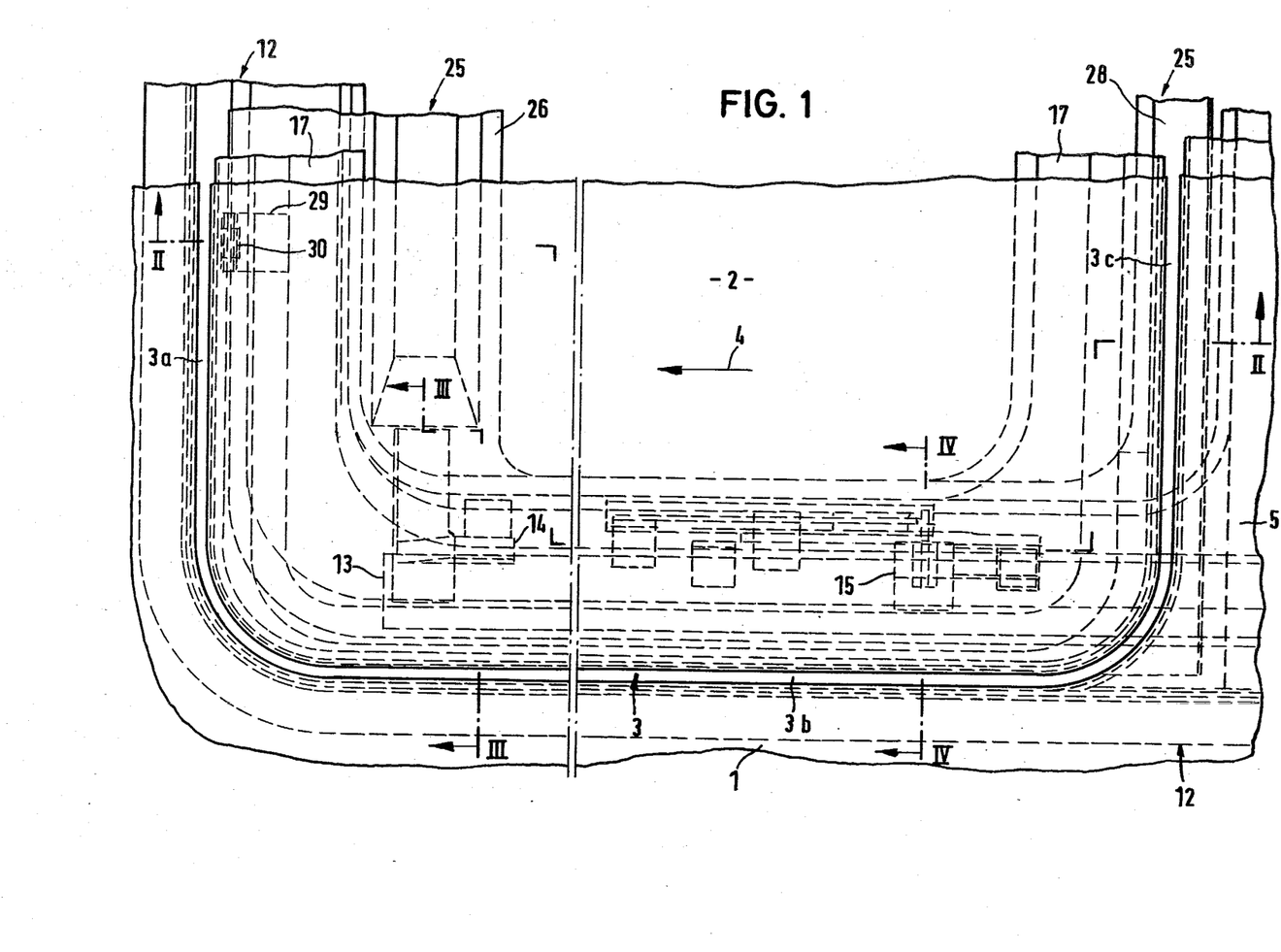
FIG. 1 is a broken-away plan view of a sliding-rising roof in an embodiment intended for use with a "weld-in roof frame"

In order to explain the basic design of the sliding-rising roof, reference is made firstly to FIGS. 1 to 4. As emerges from them, there is disposed in a vehicle roof 1 a roof cut-out not described in greater detail but which, in the closed position of the roof as shown in the drawings is closed by a correspondingly shaped rigid cover plate 2, an encircling marginal gap 3 being formed thereby. In accordance with the substantially rectangular shape of the roof cut-out and of the cover plate, the marginal gap 3 is composed of a front marginal gap 3a, lateral marginal gaps 3b, of which the drawings show only the left-hand gap, and a rear marginal gap 3c. The forward direction of travel of the vehicle is indicated in FIG. 1 by the arrow 4. The roof construction is symmetrical in relation to a central line not shown in the drawings but parallel with the arrow 4 so that reference will be made hereinafter to the roof elements on the left-hand side which is illustrated in the drawings. The roof elements on the right-hand side are correspondingly constructed. The roof cut-out and thus the cover plate 2 may be dimensioned in the usual proportions, the extension in the direction of the arrow 4 being less than the dimensions at a right-angle thereto, i.e. in the transverse direction. The rear fixed roof area of the vehicle roof 1 is identified by reference numeral 5.

Figure 2:
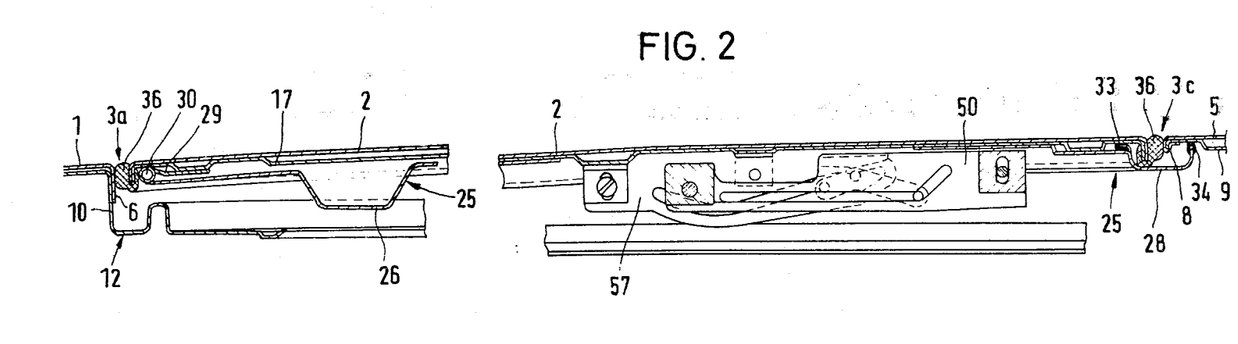
FIG. 2 is a longitudinal section through the sliding-rising roof taken on the line II—II in FIG. 1.
Figure 3:
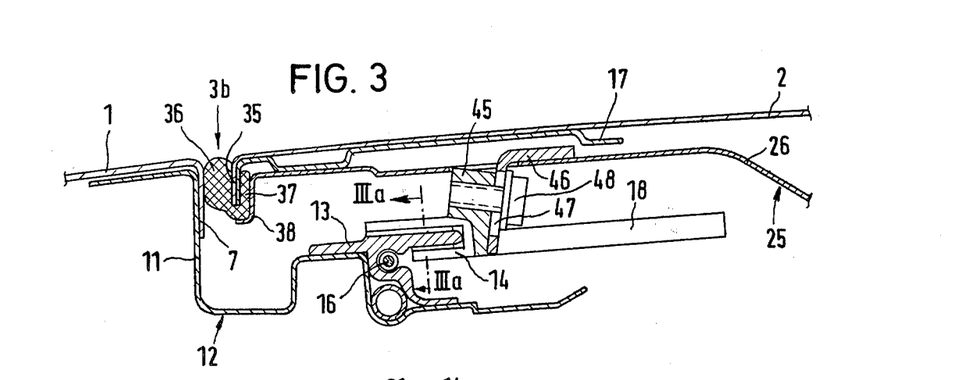
FIG. 3 is a cross-section taken on the line III—III in FIG. 1.
Figure 4:
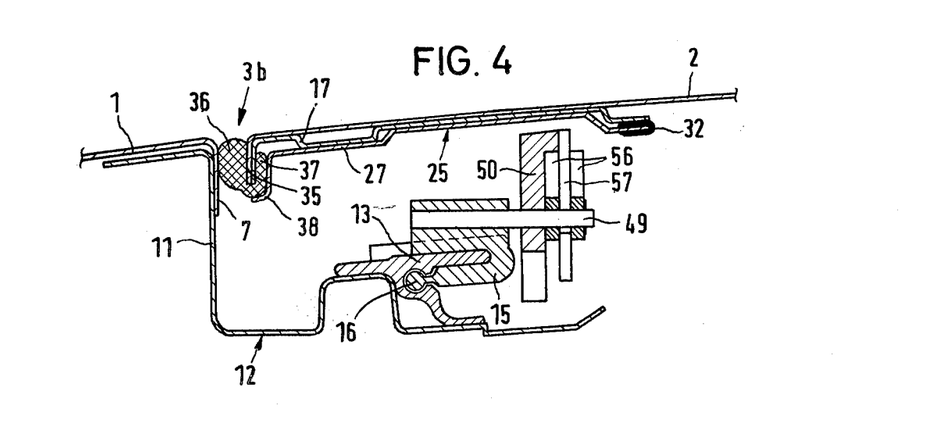
FIG. 4 is a cross-section taken on the line IV—IV in FIG. 1.

In the case of this example of embodiment, the roof cut-out is defined on the leading edge of the roof cut-out by a right-angled downwardly angled edge 6 directed towards the inside of the vehicle (FIG. 2) and on the lateral edges of the roof cut-out by corresponding downwardly angled edges 7 (FIGS. 3, 4). As FIG. 2 shows, there is at the rear edge of the roof cut-out a flanged-over edge 8, folded into which there is a roof reinforcement 9. Welded onto the rectangular downwardly angled edges 6 and 7 are corresponding upwardly angled edges 10 and 11 of a roof frame generally designated 12. The roof frame 12 surrounds the roof cut-out at the front and at the sides and extends rearwardly under the rear fixed roof area 5 in the form of a (not shown) pocket to hold the rearwardly displaced cover plate 2.

Fixed on each side of the roof cut-out is a guide rail 13 which can best be seen in FIGS. 3, 4. The cover plate 2 has front slide blocks 14 and rear slide blocks 15 by which it is displaceably mounted on the guide rails 13. Connection of the slide blocks 14, 15 to the cover plate 2 will be explained in greater detail hereinafter. The rear slide blocks 15 are engaged by cables 16 which are pressure-resistantly displaceably guided in the guide rail 13 and which connect with a drive means, not shown. All movement functions of the sliding-rising roof are carried out by means of the driven cables 16.

On its underside, the cover plate 2 is reinforced, i.e. stiffened, by a cover frame 17 connected rigidly to it. The rod-like element 18 shown in FIG. 3 and mounted on the front slide block 14 is used for attachment of the clear cover plate, not shown in the drawings.

The roof construction of the second example of embodiment described in detail hereinafter will be described with reference to FIGS. 12 to 14 and in respect of its divergently constructed parts. Components which correspond to the embodiment described with reference to FIGS. 1 to 4 are identified by the same reference numerals and will not be mentioned in greater detail hereinafter. If parts of the roof construction are not shown in FIGS. 12 to 14, then they correspond to those already described with reference to the first example of embodiment.

Figure 13:
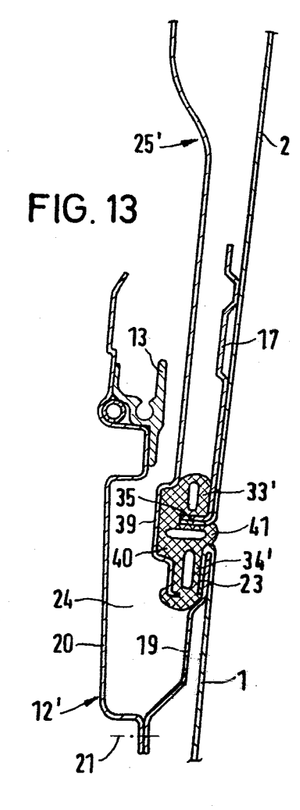
FIG. 13 shows a section taken on the line XIII—XIII in FIG. 12.
Figure 14:
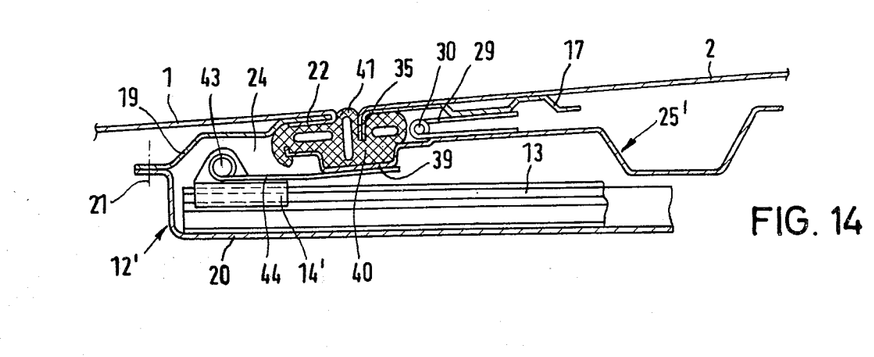
FIG. 14 shows a section taken on the line XIV—XIV in FIG. 12 but in a mirrored opposite representation

As FIGS. 13 and 14 show, the roof frame 12' is composed of an upper roof frame part 19 and a lower roof frame part 20, the two frame parts being bolted together as indicated by the dash-dotted lines 21 in FIGS. 13 and 14. The upper roof frame part 19 is folded over along the leading and lateral edges of the roof cut-out by means of 180° flanged-over edges 22, 23. By reason of this fixing of the upper roof frame part 19 and the profiling of the roof frame parts 19 and 20 which is shown in FIGS. 13 and 14, a cohesive space 24 open towards the roof cut-out is created at the front and at the sides below the vehicle roof 1.

The roof constructions described so far correspond to the usual construction of such roofs. In the ensuring part of the description, reference will be made essentially to those component parts which characterise the construction according to the invention. To this end, reference will initially and again be made to FIGS. 1 to 4.

Disposed between the cover plate 2 and the cover frame 12 is a one-piece intermediate frame 25 which consists of profile sheet metal and which comprises a front frame part 26, lateral frame parts 27 and a rear frame part 28. The cover plate 2 is connected to the intermediate frame 25 by two laterally disposed hinges 29, of which the hinge lug is disposed in the vicinity of the front edge of the cover plate 2. In this way, the cover plate 2 is pivotally mounted in relation to the intermediate frame 25, thus making it possible to lift the cover plate 2 beyond the roof 1 of the vehicle.

Figure 3A:
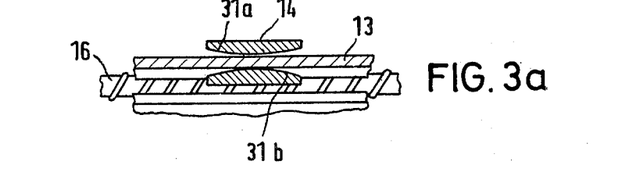
FIG. 3a is a broken-away section taken on the line IIIa—IIIa in FIG. 3.

The intermediate frame 25 is pivotally mounted on the front slide blocks 14 in the manner which is shown in FIGS. 3 and 3a. For this purpose, the slide blocks 14, as FIG. 3a in particular illustrates, have mutually facing convex faces 31a and 31b which not only permit of a displacement of the guide shoe 14 on the guide rail 13 but also rolling movements so that for practical purposes, there is created between the convex guide faces 31a and 31b a pivot axis which shifts slightly during the rolling motion but which connects the two front slide blocks 14 to each other. This pivoting movement makes it possible to lower the rear edge of the cover plate before moving the cover plate to a position underneath the rear fixed roof area, or to raise the rear edge of the cover plate into the position of closure of the roof which is shown in FIG. 2.

As can be seen in FIGS. 3 and 4 and also in the right-hand part of FIG. 2, when the roof is closed, the cover plate 2 has its frame 17 resting on the intermediate frame 25 or on sealing elements 32 (FIG. 4) fitted laterally onto the intermediate frame 25 and it also rests on the sealing element 33 which is fitted onto the rear frame part 28. The rear frame part 28 carries a further fitted-on strip-like sealing element 34 (FIG. 2), so that in the closed position the rear frame part 28 of the intermediate frame 25, with its sealing elements 33 and 34 on the one hand bears on the underside of the cover plate 2 and on the other on the underside of the rear roof area 5.

As illustrated by FIG. 1 in conjunction with FIGS. 2 to 4, the front and lateral edges of the intermediate frame 25 are substantially flush with the corresponding cover plate edges while the rear frame part 28 engages underneath the rear marginal gap 3c. The rear frame part 28 has substantially the form of an open-topped U profile so that any water which happens to penetrate the marginal gap 3c can be trapped and dissipated laterally into the roof frame 12 which has water guide elements of the conventional type. The encircling marginal gap 3 is sealed by an encircling marginal gap seal 36 which is fitted from below onto the encircling downwardly angled cover plate edge 35, the marginal gap seal 36 not being shown in FIG. 1 in order to render the illustration clearer. The marginal gap seal 36 has an encircling inner flange 37 which bears on lateral edges 38 of the intermediate frame 25 while it is not connected to these edges, so that relative displacements are possible between the flange 37 and the edges 38 during raising and lowering movements of the cover plate 2.

Figure 12:
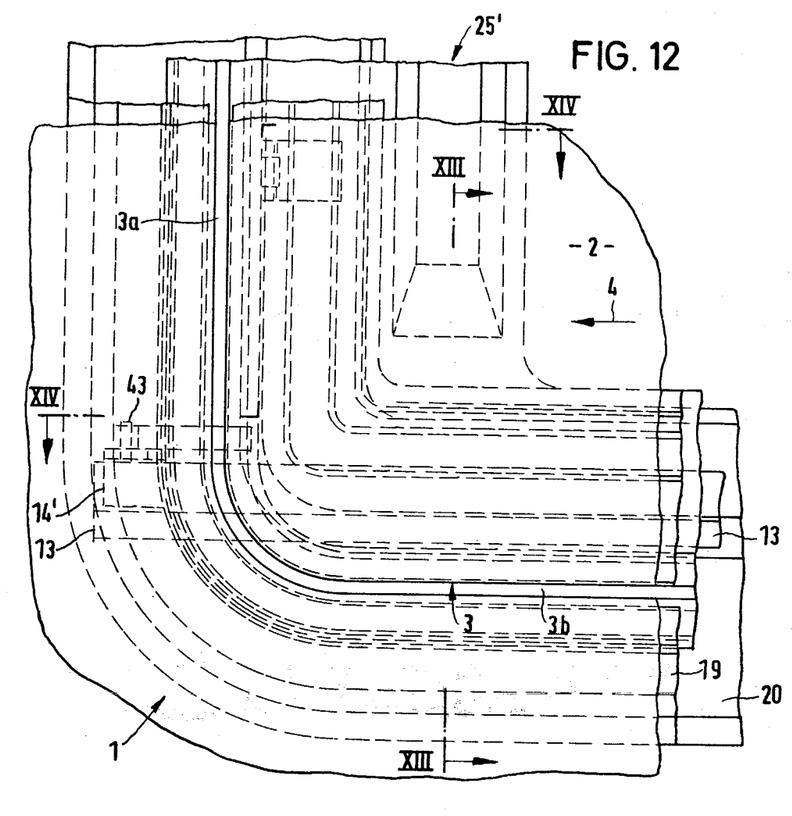
FIG. 12 is a broken-away plan view of the second embodiment of sliding-rising roof when using a "screw-in roof frame"
Figures 15, 16, 17, 18:
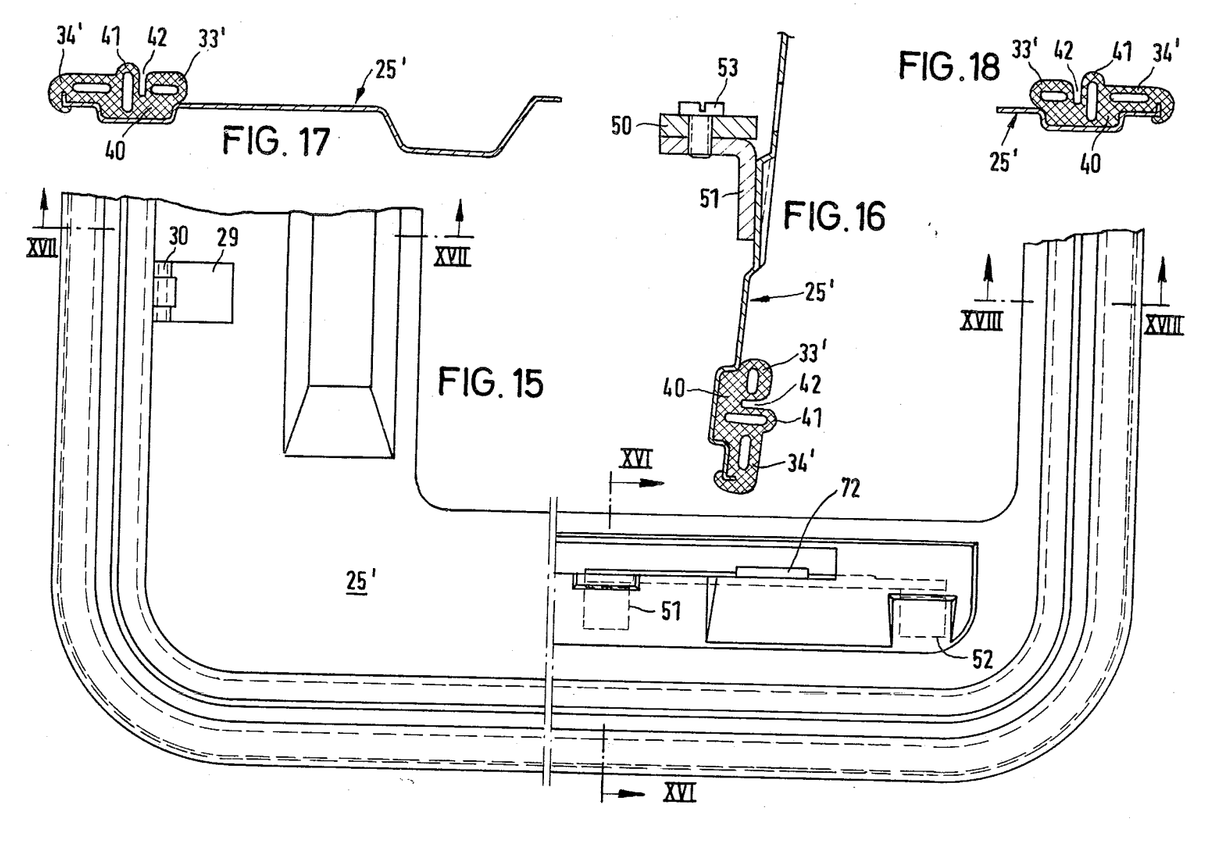
FIG. 15 is a broken-away plan view of the intermediate frame used for the second embodiment.
FIG. 16 shows a section taken on the line XVI—XVI in FIG. 15.
FIG. 17 shows a section taken on the line XVII—XVII in FIG. 15.
FIG. 18 shows a section taken on the line XVIII—XVIII in FIG. 15.

In the case of the roof construction according to FIGS. 12 to 14, the intermediate frame 25' is different in construction. In particular, the intermediate frame 25' projects beyond all outer edges of the cover plate and, when the cover plate is closed, it extends forwards and laterally into the space which is open towards the roof cut-out, as FIGS. 13 and 14 illustrate. Below the encircling marginal gap 3, the intermediate frame 25' has a likewise encircling depression 39 into which an encircling profiled seal 40 engages in form-locking fashion. The profiled seal 40 is not shown in FIG. 12, on grounds of clarity. A rib 41 provided on the profiled seal 40 engages into the encircling marginal gap 3 which it closes. Both sides of the rib 41 are sealing elements 33' and 34' which are in one piece with the profiled seal 40 and bear on the one hand on the underside of the seal and on the other on the underside of the roof area so that the marginal gap is hermetically sealed, and in fact not only the rear marginal gap 3c but the encircling marginal gap. As a result of this hermetic seal, an outstanding noise damping effect is achieved when the cover plate is closed. By virtue of the arrangement described and shown in the drawings, no water can penetrate even at the critical location of the rear marginal gap 3c. The profiled seal 40 which is constructed as a hollow chamber profile has not only the rib 41 but also an encircling depression 42 (FIGS. 16 to 18) into which the downwardly angled edge 35 of the cover plate 2 tightly engages when the roof is in the closed position and in any displaced position.

In the case of the embodiment according to FIGS. 12 to 14, the hinges 29 have their lug 40 in the vicinity of the depression 39 FIG. 14). Also with this arrangement, the hinge lugs 30 are still relatively closely located to the front downwardly angled edge 35 of the cover plate so that during movements designed to lift the cover plate 2, the front downwardly turned edge of the cover plate cannot plunge substantially into the roof cut-out. As FIG. 14 also shows, in the position of closure, the front slide blocks 14' are disposed within the space 24 below the vehicle roof 1, there being provided on the front slide blocks 14" bearing pins 43 on which the intermediate frame 25' is articulated by means of bearing lugs 44. By reason of the articulation on the bearing pins 43, the movement of lowering the rear edge of the cover plate or the movement of raising the rear edge of the cover plate into the position of closure becomes feasible. The bearing pins 43 on both sides of the cover plate 2 form the pivot axis. By virtue of this arrangement, with this example of embodiment, the guide faces associated with the guide rail 13 are not convex but plane parallel.

With reference to the first example of embodiment, FIG. 3 shows a vertical adjustment device which is conventionally found in such roof constructions and which permits of an aligned adjustment of the outer faces of the vehicle roof 1 and of the cover plate 2. On the left as well as on the right-hand side of the cover plate 2, this consists in each case of a threaded boss 45 rigidly connected to the front slide block 14 and on which an angular adjusting member 46 fixed on the intermediate frame 25 bears, in contrast to previously known examples. The angular adjusting member is provided with a substantially perpendicularly orientated elongated hole 47 through which passes an adjusting screw 48 which is screwed into the threaded boss 45. When the adjusting screw 48 is slackened, the cover plate 2 can easily be adjusted to the height of the vehicle roof 1, whereupon this position of adjustment can be fixed by tightening the adjusting screw 48.

By way of explanation of the driving connection between the rear slide blocks 15 on the one hand and the intermediate frame 25 or 25' with the cover plate 2 on the other, reference will now be made essentially to FIGS. 4 to 7. At the same time, the interlocking of the cover plate in its position of closure to prevent undesired lifting of its rear edge will also be explained. For better understanding of the relationships, attention should be drawn to the fact that in all pivoting movements, i.e. rising and lowering movements, of the cover plate 2, which occur above the vehicle roof 1, the intermediate frame 25 or 25' remains in its closure or inoperative position shown in FIGS. 2 and 5 while in the event of lowering movements or rising movements below the vehicle roof and in all sliding movements of the cover plate 2, it follows these movements of the cover plate.

As FIG. 4 shows, a substantially horizontally disposed guide pin 49 orientated transversely of the direction of displacement of the cover plate (see arrow 4, FIGS. 1, 12), is connected to the rear slide blocks 15 which is rigidly connected to the cable. This guide pin 49 engages a first guide link 50 fixed laterally on the intermediate frame 25 (or 25'). For attachment of the first guide link 50, two angle supports 51 and 52 are fixed on the intermediate frame 25, 25', as can be seen from FIGS. 5 to 7 in conjunction with FIGS. 9 and 16.

Mounted on the perpendicularly orientated arms of the angle supports 51 and 52 by means of screws 53 and 54 is the first guide link 50, the screw 54 being disposed in an elongated hole 55 in the angular support 52 in order to permit of vertical adjustments.

Pivotally mounted on the free end of the guide pin 49 is a raising lever 56 which engages a second guide link 57 fixed laterally on the cover plate 2. The raising lever 56 is, as can be seen in FIG. 4, constructed in two parts and has its two parts bearing on the two sides of the second guide link. This reliably prevents tilting on the guide elements. Attachment of the second guide link 57 on the cover plate 2 is effected by means of two fixing angles 58 and 59 which are secured on the one hand on the cover plate 2 or on parts rigid with the cover plate and on the other their perpendicular arms support the second guide link 57 which is secured thereon by means of screws 60 and 61. The screw 60 is again disposed in an alongated hole 73 in the fixing angle 58 so that vertical adjustment capability is also provided here. Engagement of the raising lever 56 into the second guide link 57 is effected by means of two slide pins 62 and 63 mounted at a distance from each other on the raising lever 56.

Figure 5:
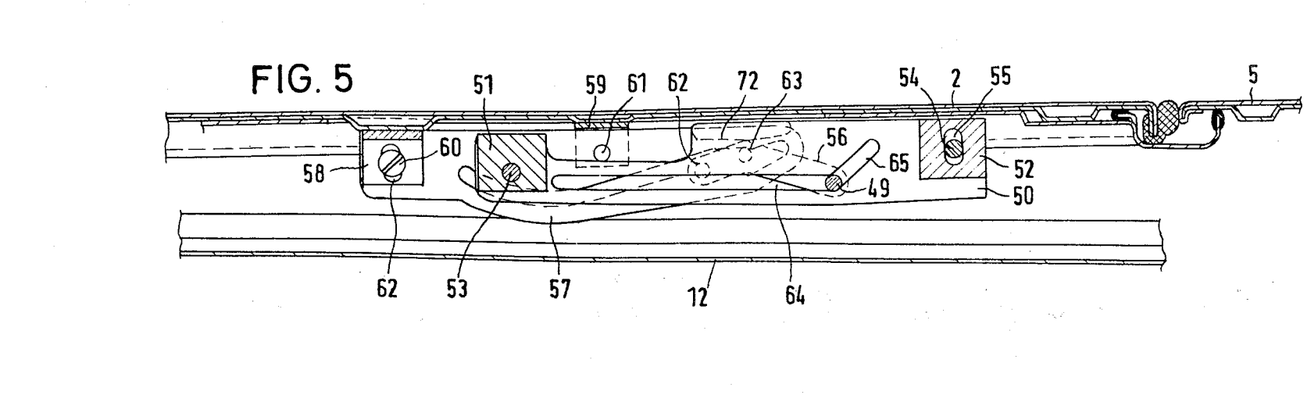
FIG. 5 is a broken-away longitudinal section through the rear area of the closed roof corresponding to FIG. 2 but shown on a larger scale.
Figure 6:
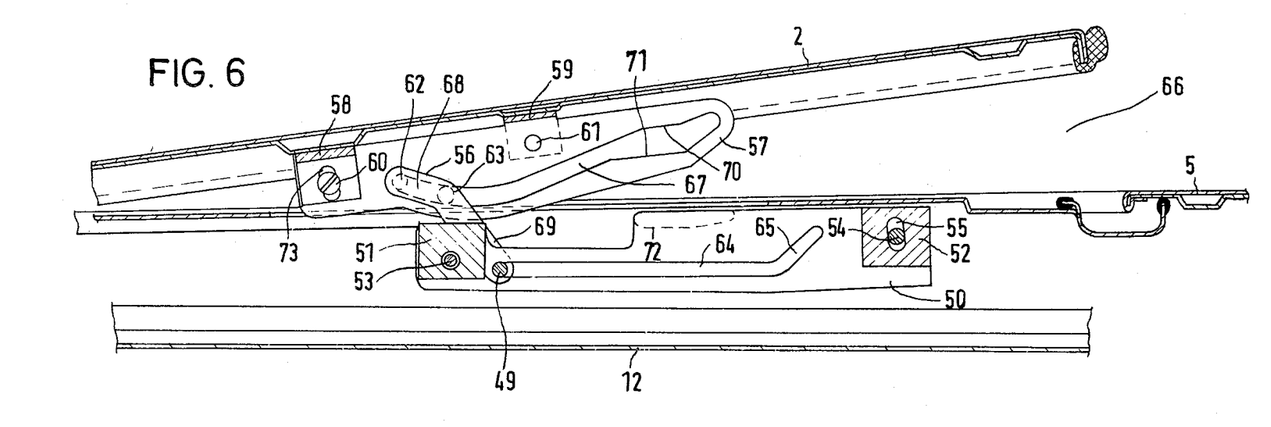
FIG. 6 shows a longitudinal section corresponding to that in FIG. 5 but with the cover plate raised.
Figure 7:
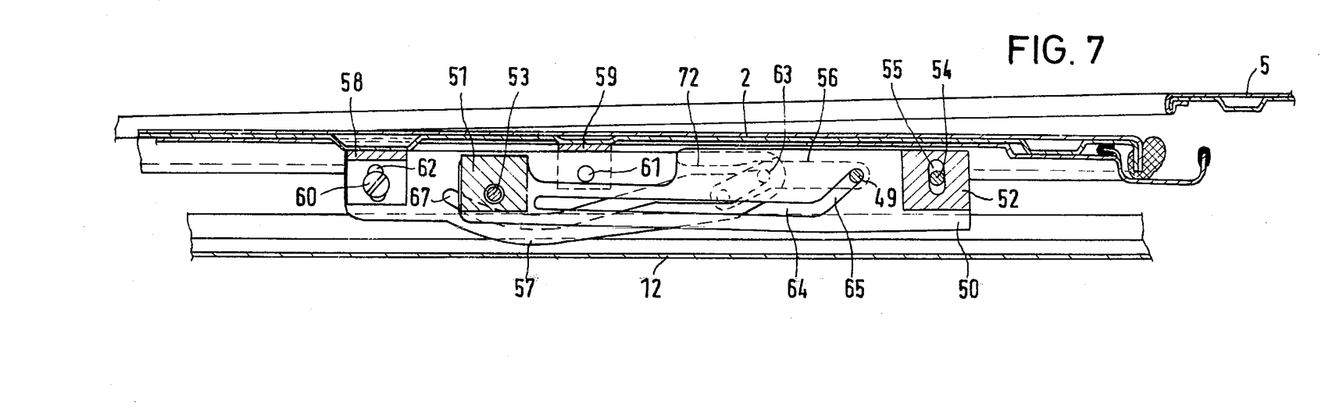
FIG. 7 shows a longitudinal section corresponding to that in FIGS. 5 and 6 but with the cover plate lowered.
Figures 8, 9, 10, 11:
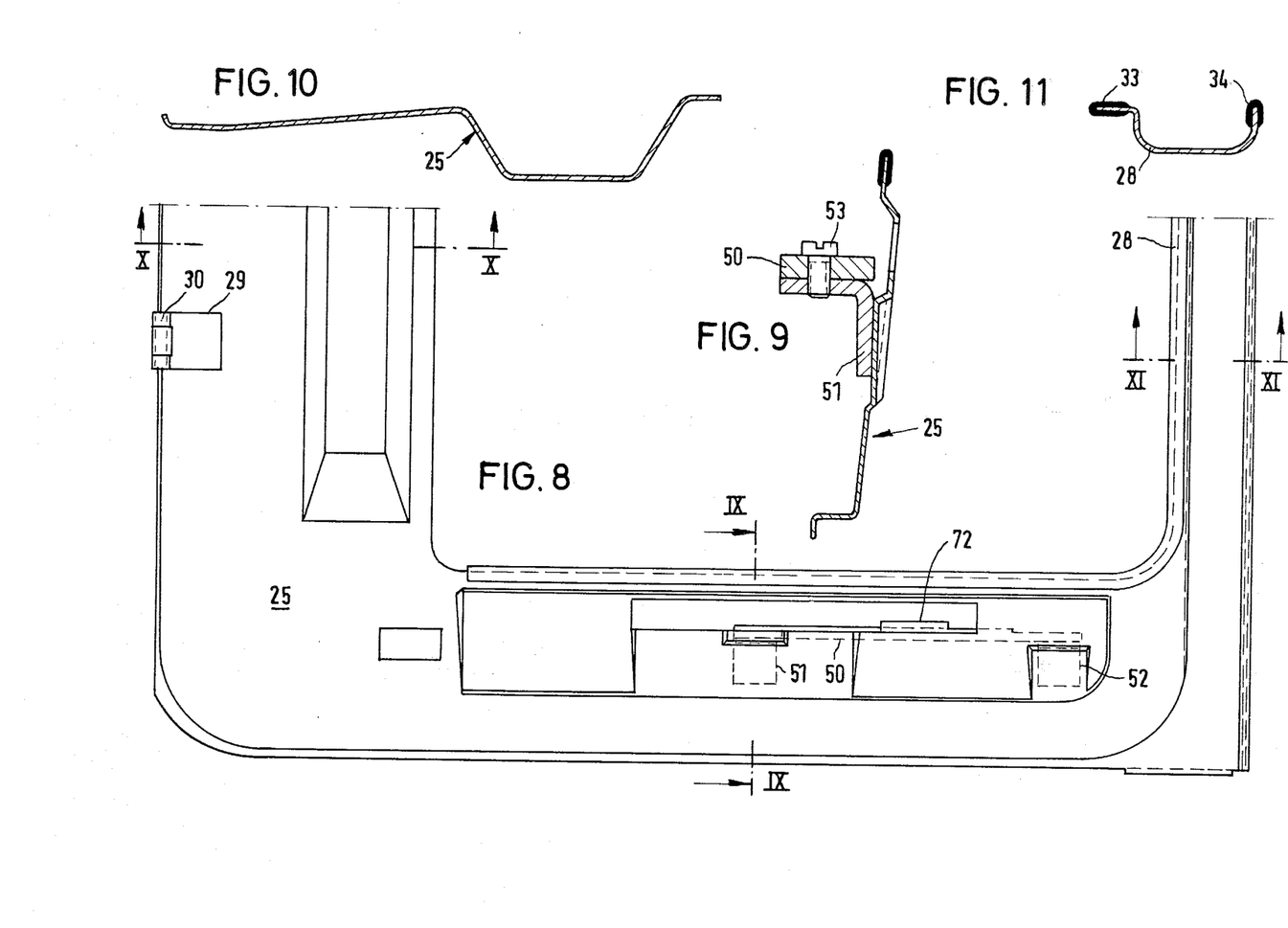
FIG. 8 is a broken-away plan view of the intermediate frame used in the embodiment shown in FIG. 1.
FIG. 9 shows a section taken on the line IX—IX in FIG. 8.
FIG. 10 shows a section taken on the line X—X in FIG. 8.
FIG. 11 shows a section taken on the line XI—XI in FIG. 8.

The first guide link 50 has a guide slot 64 which in the position of closure and in any position in which the cover plate is raised above the vehicle roof 1, extends parallel with the adjacent guide rail 13, as FIGS. 5 and 6 show, these drawings indeed not showing the guide rail itself (due to the way the cross-section is taken), but the roof frame 12 (or 12') which is parallel with the guide rail. Adjacent to the guide slot 64 is a rearwardly risingly extending shorter guide slot 65. In the closed position of the roof which is shown in FIG. 5, the guide pin 49 is disposed at the transition between the elongated guide slot 64 and the shorter guide slot 65. Starting from the position of closure, raising of the cover plate 2 in order to open it results in the guide pin 49 moving to the position shown in FIG. 6, within the elongated guide slot 64 and leftwardly until it reaches the position shown in FIG. 6, the position of maximum raising. It is evident that the guide pin 59 can occupy any intermediate position within the guide slot 64 so that the cover plate 2 can occupy any intermediate position between the closed position and its most extreme raised position. This means that it is possible for the ventilation gap generally designated 66 in FIG. 6 to be adjusted to any of various widths. During the lowering movement of the cover plate, starting from the position of closure according to FIG. 5 and into the position according to FIG. 7, the guide pin 49 which as always is guided parallel with the guide rail 13, moves within the shorter guide slot 65, so that the first guide link 50, the intermediate frame 25 (or 25') connected therewith and the cover plate 2 can be pivoted downwardly until the extreme position of the guide pin 49 in the guide slot 65 as shown in FIG. 7 has been reached. Starting from this extreme position, the cover plate 2 can be displaced beneath the rear rigid roof area 5. If the cover plate 2 is moved out of a displaced position forwardly again by means of the drive cables, i.e. to the left as indicated in the drawings, then securing elements not shown in the drawings ensure that during the displacement movement, the cover plate 2 cannot rise unintentionally upwardly. These securing elements which do not form part of the present invention become ineffective only when the position shown in FIG. 5 has again been attained. Starting from this position, the cover plate can again be caused to rise into its position of closure and beyond. Rising into the position of closure is in turn brought about by interaction of the guide pin 49 with the shorter guide slot 65.

Provided in the second guide link 57 is a guide slot 67 having more or less the form of a horizontal flat letter "S". This guide slot 67 is engaged by the two slide pins 62 and 63 of the raising lever 56. By virtue of this arrangement, in the event of displacement of the slide pins 62 and 63 in the guide slot 67, the raising lever 57 is not only displaced forwardly or rearwardly, as the case may be, but is also pivoted, as dictated by the pattern of the guide slot 67. The raising lever 56 is angled-over obtusely and downwardly so that it has a shorter arm 68 and a longer arm 69. At the apex of the angle and at the end of the shorter arm 68 there are respectively guide pins 63 and 62.

As is best revealed by FIG. 6, the rear portion of the guide slot 67 has two oppositely disposed and mutually parallel portions 70 and 71 which, in the closed position according to FIG. 5, extend parallel with the guide rail 13 represented by the roof frame 12 (or 12'). As can also be seen from FIG. 5, in the position of closure in which the guide pin 49 is disposed at the transition between the guide slot 64 and the guide slot 65 of the first guide link, the slide pins 62 and 63 bear on the portions 71, 70. Furthermore, the raising lever 56 bears on the underside of a locking rib 72 provided on the first guide link 50. By reason of this situation, in its position of closure, the cover plate 2 is prevented from having its rear edge unintentionally lifted because, in the closed position, by virtue of this fact that the raising lever 56 is bearing in the manner described, it is prevented from performing any pivoting movement. Nor can it be lifted off the guide rail 13 because the guide pin 49 which is at an invariable distance from the guide rail 13, engages into the first guide link 50 and thus prevents its performing any pivoting movements.

Only displacements of the rear slide blocks 15 and thus of the guide pins 49 which are initiated by the drive cables 16 are capable of overcoming this locking position. In the case of lifting movements of the sliding roof cover 2 in the direction of the position of maximum lift shown in FIG. 6, the slide pins 62 and 63 move forwardly as the raising lever 56 is entrained by the guide pin 49 and, due to the geometry of the raising lever 56 and the pattern of the guide slot 67, they have the effect of pushing out the raising lever 56. In the case of lowering movements below the vehicle roof 1, into the commencement-of-slide position shown in FIG. 7, the guide pin 49 moves the raising lever 56 rightwardly until the slide pin 63 is at the rear end of the guide slot 67. If, now, the movement of displacement is initiated by continued operation of the cable drive, then the guide pin 49 draws not only the link 50 and thus the intermediate frame 25 or 25' but, via the raising lever 56 and the slide pin 63, also the second guide link 57 and thus the cover plate 2 itself under the rear fixed roof area 5. Upon the closing displacement, in which the cover plate 2 is moved leftwards in respect of FIGS. 5 to 7, the guide pin 49 pulls with it the first guide link 50 which is initially prevented from rising, and thus also the intermediate frame 25, 25', moving them leftwardly, but at the same time it entrains the cover plate 2 which is engaged therewith, until the position shown in FIG. 7 is again attained. With continued cable drive, the guide pin 49 which is constantly guided parallel with the guide rail 13 is now displaced within the guide slot 65 resulting in the cover plate rising into the position shown in FIG. 5, accompanied by a simultaneous interlocking effect.

Because the intermediate frame 25, 2' is bearing on the underside of the vehicle roof 1, the former is incapable of participating in the lifting movement, starting from the position shown in FIG. 5 and extending at most to the position shown in FIG. 6.

We claim:

1. Sliding-rising roof for motor vehicles comprising: a rigid cover plate which in its closed position, closes a roof cut-out while forming an encircling marginal gap; said cover plate having front and rear slide blocks by which it is laterally guided on guide rails mounted in the roof cut-out; said front and rear slide blocks being driven by pressure-resistantly and displaceably guided cables which engage said rear slide blocks; said cover plate being capable of being either raised in the manner of front hinged ventilator flaps, by having its rear edge raised or, once its rear edge has been lowered, moved under the rear rigid roof cover; the front edge of said cover plate being pivotally mounted on an intermediate frame which is in turn pivotally mounted on the front slide blocks; the rear frame part of said intermediate frame engaging beneath a marginal gap with interposition of a first and second sealing element which when in the closed position said first sealing element bears on the underside of the cover plate and said second sealing element bears on the underside of the roof area; and in that the rear slide blocks are in driving connection with the intermediate frame and the cover plate, the intermediate frame is fixed in the closed position during pivoting movement of the cover plate and, starting from the closed position, is interlocked with the cover plate upon lowering of the rear edge of the cover plate and being displaceable together therewith; and a guide pin fixed on each of the two rear slide blocks directed substantially horizontally and tranversely of the direction of cover plate displacement, the guide pin engaging a first guide link mounted laterally on the intermediate frame and having pivotally mounted on its free end a raising lever which has first and second spaced-apart slide pins mounted on it which engage into a second guide link mounted laterally on the cover plate.

2. Sliding-rising roof according to claim 1, wherein the front and the lateral edges of the roof cut-out has downwardly turned edges directed inwardly into the vehicle, adjacent to which there are correspondingly upwardly turned edges on the roof frame, the sliding-rising roof having a flanged-over edge at the rear edge of the roof cut-out, said front and lateral edges of the intermediate frame being substantially flush with the corresponding edges of the cover plate, the lateral edges of the intermediate frame bearing on an encircling marginal gap seal fitted onto the encircling downwardly angled edge, the intermediate frame being displaceable in the direction in which the cover plate is raised, and the rear frame part of the intermediate frame has substantially the form of an open topped U-shaped profile onto the arms of which the first and second sealing elements are fitted.

3. Sliding-rising roof according to claim 1, wherein there are 180° flanged-over edges on all roof cut-out edges adjacent to which, at the front and at the sides and extending underneath the fixed roof area there is an upper roof frame part which is separably connected to a lower roof frame part, forming a space which is open towards the roof cut-out, and the intermediate frame projects beyond all the outer edges of the cover plate and, in the closed position, extends at the front and sides into the space which is open towards the roof cut-out and an encircling profiled seal fixed on the outer rim of the intermediate frame having a rib which extends into the marginal gap and on which the first and second sealing elements are mounted on both sides of the rib.

4. Sliding-rising roof according to one of claims 1 to 3, wherein, for pivotable connection of the cover plate to the intermediate frame, two mutually spaced-apart hinges are mounted at the front edge of the cover plate, the hinge lug of which is towards the front edge of the cover plate and hinge parts of which are fixed on the one hand on the cover plate and on the other on the intermediate frame.

5. Sliding-rising roof according to claim 4, wherein a first guide slot is in the first guide link, for the guide pin, said first guide slot being elongated in the position of closure and in any raised position disposed parallel with an adjacent guide rail and, following on from the first guide slot, a shorter upwardly and rearwardly rising second guide slot having a third guide slot which is of approximately horizontal flat S-shape, and said raising lever is angled downwardly at an obtuse angle forming a shorter and a longer arm said first slide pins being fitted at the apex of the angle and said second slide pin being fitted at the end of the shorter arm, while the longer arm has its end pivotally mounted on the first guide pin.

6. Sliding-rising roof according to claim 5 wherein the third guide slot of the second guide link has in its rear zone and disposed opposite each other, parallel with each other and in the closed position likewise parallel with the adjacent guide rail a first and second portion on which, in the closed position, the first slide pin rests on the first portion and the second slide pin rests on the second portion while the guide pin is located at the transition between the first and second guide slots of the first guide link and in that the raising lever, in the closed position and any position of displacement, bears on the underside of an interlocking rib provided on the first guide link whereby, in any position of displacement, the first slide pin mounted substantially at the apex of the angle of the raising lever is disposed at the rear end of the guide slot of the second guide link while the guide pin is located at the end of the shorter guide slot in the first guide link.

7. Sliding-rising roof according to claim 6 wherein the raising lever is composed of two identical parts connected to each other by the first and second slide pins and between which there is disposed the second guide link and in which the guide pin is pivotally mounted.

8. Sliding-rising roof according to any one of claims 1 to 3, wherein a first guide slot is in the first guide link for the guide pin, said first guide slot being elongated in the position of closure and in any raised position disposed parallel with an adjacent guide rail and, following on from the first guide slot, a shorter upwardly and rearwardly rising second guide slot having a third guide slot which is of approximately horizontal flat S-shape, and said raising lever is angled downwardly at an obtuse angle forming a shorter and a longer arm said first slide pins being fitted at the apex of the angle and said second slide pins being fitted at the end of the shorter arm, while the longer arm has its end pivotally mounted on the first guide pin.

9. Sliding-rising roof according to any one of claims 1 to 3, wherein the third guide slot of the second guide link has in its rear zone and disposed opposite each other, parallel with each other and in the closed position likewise parallel with the adjacent guide rail a first and second portion on which, in the closed position, the first slide pin rests on the first portion and the second slide pin rests on the second portion while the guide pin is located at the transition between the first and second guide slots of the first guide link and in that the raising lever, in the closed position and any position of displacement, bears on the underside of an interlocking rib provided on the first guide link whereby, in any position of displacement, the first slide pin mounted substantially at the apex of the angle of the raising lever is disposed at the rear end of the guide slot of the second guide link while the guide pin is located at the end of the shorter guide slot in the first guide link.

10. Sliding-rising roof according to any one of claims 1 to 3, wherein the raising lever is composed of two identical parts connected to each other by the first and second slide pins and between which there is disposed the second guide link and in which the guide pin is pivotally mounted.

11. Sliding-rising roof according to claim 3, wherein said encircling downwardly angled rim of the cover plate, in the position of closure and in any position of displacement, engages a corresponding encircling depression in the sealing profile.

12. Sliding-rising roof according to claim 4 wherein the raising lever is composed of two identical parts connected to each other by the first and second slide pins and between which there is disposed the second guide link and in which the guide pin is pivotally mounted.

13. Sliding-rising roof according to claim 5 wherein the raising lever is composed of two identical parts connected to each other by the first and second slide pins and between which there is disposed the second guide link and in which the guide pin is pivotally mounted.

14. Sliding-rising roof according to claim 4 wherein the third guide slot of the second guide link has in its rear zone and disposed opposite each other, parallel with each other and in the closed position likewise parallel with the adjacent guide rails a first and second portion on which, in the closed position, the first slide pin rests on the first portion and the second slide pin rests on the second portion while the guide pin is located at the transition between first and second guide slots of the first guide link and in that the raising lever, in the closed position and any position of displacement, bears on the underside of an interlocking rib provided on the first guide link whereby, in any position of displacement, the first slide pin mounted substantially at the apex of the angle of the raising lever is disposed at the rear end of the guide slot of the second guide link while the guide pin is located at the end of the shorter guide slot in the first guide link.

15. Sliding-rising roof according to claim 14 wherein the raising lever is composed of two identical parts connected to each other by the first and second slide pins and between which there is disposed the sedond guide link and in which the guide pin is pivotally mounted.

16. Sliding-rising roof according to claim 8 wherein the third guide slot of the second guide link has in its rear zone and disposed opposite each other, parallel with each other and in the closed position likewise parallel with the adjacent guide rail a first and second portion in which, in the closed position, the first slide pin rests in the first portion and the second slide pin rests on the second portion while the guide pin is located at the transition between the first and second guide slots in that the raising lever, in the closed position and any position of displacement bears on the underside of an interlocking rib provided on the first guide link whereby, in any position of displacement, the first guide pin mounted substantially at the apex of the angle of the raising lever is disposed at the rear end of the guide slot of the second guide link while the guide pin is located at the end of the shorter guide slot in the first guide link.

17. Sliding-rising roof according to claim 16 wherein the raising lever is composed of two identical parts connected to each other by the first and second slide pins and between which there is disposed the second guide link and in which the guide pin is pivotally mounted.

18. Sliding-rising roof according to claim 8 wherein the raising lever is composed of two identical parts connected to each other by the first and second slide pins and between which there is disposed the second guide link and in which the guide pin is pivotally mounted.

19. Sliding-rising roof according to claim 9 wherein the raising lever is composed of two identical parts connected to each other by the first and second slide pins and between which there is disposed the second guide link and in which the guide pin is pivotally mounted.

* * * * *